(12) United States Patent
Yue et al.

(10) Patent No.: US 10,504,120 B2
(45) Date of Patent: Dec. 10, 2019

(54) DETERMINING A TEMPORARY TRANSACTION LIMIT

(71) Applicant: Alibaba Group Holding Limited, George Town (KY)

(72) Inventors: Yun Yue, Hangzhou (CN); Ji Huang, Hangzhou (CN); Zhi Ning, Hangzhou (CN)

(73) Assignee: Alibaba Group Holding Limited (KY)

( * ) Notice: Subject to any disclaimer, the term of this patent is extended or adjusted under 35 U.S.C. 154(b) by 403 days.

(21) Appl. No.: 14/656,382

(22) Filed: Mar. 12, 2015

(65) Prior Publication Data

US 2015/0278813 A1 Oct. 1, 2015

(30) Foreign Application Priority Data

Mar. 25, 2014 (CN) .......................... 2014 1 0113875

(51) Int. Cl.
*G06Q 20/40* (2012.01)

(52) U.S. Cl.
CPC ................................ *G06Q 20/405* (2013.01)

(58) Field of Classification Search
CPC ..... G06Q 40/025; G06Q 40/00; G06Q 20/405
See application file for complete search history.

(56) References Cited

U.S. PATENT DOCUMENTS

| | | | | |
|---|---|---|---|---|
| 5,177,342 A | * | 1/1993 | Adams .................. | G06Q 20/403 235/379 |
| 6,658,393 B1 | * | 12/2003 | Basch .................. | G06Q 20/341 705/35 |

(Continued)

FOREIGN PATENT DOCUMENTS

| | | |
|---|---|---|
| CN | 1510598 | 7/2004 |
| CN | 102034181 | 4/2011 |

(Continued)

OTHER PUBLICATIONS

Vadoodparast, Massoud, and Abdul Razak Hamdan. "Fraudulent Electronic Transaction Detection Using Dynamic KDA Model." International Journal of Computer Science and Information Security 13, No. 3 (2015): 90.*

(Continued)

*Primary Examiner* — Peter Ludwig
*Assistant Examiner* — James H Miller
(74) *Attorney, Agent, or Firm* — Van Pelt, Yi & James LLP (57) ABSTRACT

Determining a temporary transaction limit is disclosed, including: receiving a transaction request message, wherein the transaction request message includes a total transaction cost and identifying information associated with a user; determining that the total transaction cost is greater than a predetermined limit; retrieving historical transaction data associated with a plurality of users; determining a plurality of clustered classifications from the historical transaction data associated with the plurality of users; determining a clustered classification from the plurality of clustered classifications based on historical transaction data associated with the user; determining a dynamic quota corresponding to the clustered classification for the user using a predetermined mapping rule; and determining whether the transaction request message is approved based on comparing the total transaction cost to a temporary transaction limit, wherein the temporary transaction limit comprises a combination of the predetermined limit and the dynamic quota.

13 Claims, 9 Drawing Sheets

(56) References Cited

U.S. PATENT DOCUMENTS

| | | | |
|---|---|---|---|
| 7,383,224 B2 | 6/2008 | Huennekens et al. | |
| 8,521,542 B1 | 8/2013 | Stotts | |
| 8,799,161 B2 | 8/2014 | Kreutz et al. | |
| 2003/0208439 A1* | 11/2003 | Rast | G06Q 20/04 705/38 |
| 2006/0178984 A1* | 8/2006 | Anderson | G06Q 20/04 705/39 |
| 2009/0307049 A1* | 12/2009 | Elliott, Jr. | G06Q 30/0201 705/7.29 |
| 2012/0265681 A1* | 10/2012 | Ross | G06Q 40/02 705/44 |
| 2014/0032395 A1 | 1/2014 | Rajasekaran | |
| 2015/0348011 A1 | 12/2015 | Li | |

FOREIGN PATENT DOCUMENTS

| | | | |
|---|---|---|---|
| EP | 0485090 A2 * | 5/1992 | G06Q 20/403 |
| JP | 2001306829 A | 11/2001 | |
| JP | 2001331749 A | 11/2001 | |
| JP | 2002049814 A | 2/2002 | |
| JP | 2003132294 A | 5/2003 | |
| JP | 2004213452 A | 7/2004 | |
| KR | 20050091203 | 9/2005 | |
| KR | 20110092261 | 8/2011 | |

OTHER PUBLICATIONS

Vadoodparast, Massoud, and Abdul Razak Hamdan. "Fraudulent Electronic Transaction Detection Using Dynamic KDA Model." International Journal of Computer Science and Information Security 13, No. 3 (2015): 90. (Year: 2015).*

* cited by examiner

DETERMINING A TEMPORARY TRANSACTION LIMIT

CROSS REFERENCE TO OTHER APPLICATIONS

This application claims priority to People's Republic of China Patent Application No. 201410113875.2 entitled A METHOD AND A PLATFORM FOR PROCESSING BIG DATA, filed Mar. 25, 2014 which is incorporated herein by reference for all purposes.

FIELD OF THE INVENTION

The present application relates to the field of big data processing technology. In particular, the present application relates to techniques for processing big data.

BACKGROUND OF THE INVENTION

The Internet generates vast amounts of data every day. For example, blogs, micro-blogs, and transaction platforms such as Twitter, Facebook, and other social networks are generating huge amounts of data every day. Data has penetrated every industry and industrial function. For some businesses, transaction processes, product uses, and human behavior information have all been converted into data.

This generated data can appear vast, disorganized, and not subject to any easily discernible rules, but in terms of its overall distribution, the generated data has certain characteristics that can reflect certain features. The question of how to mine and process this vast and messy data to obtain useful information is an important research topic in the fields of big data and data mining. Data mining is the process of extracting information and knowledge from large quantities of incomplete, noisy, fuzzy, and/or random actual application data. While the exact type of knowledge that may be included in such data may be unknown to people prior to data mining it, the knowledge that could be mined from the data is potentially very useful.

An important type of processing in big data mining is clustering treatment. In clustering treatment, a large quantity of data object sets can be divided into a series of meaningful subsets, i.e., clusters. Cluster analysis consists of dividing a group of data objects into several categories according to similarities and differences. The goal of cluster analysis is to result in the maximum similarity among data belonging to the same category and the minimum similarity between data in different categories. Cluster analysis can be applied to customer classification, customer background analysis, customer purchasing trend forecasting, market segmentation, and other fields.

Cluster analysis generally produces data object grouping in which similar data objects are clustered in a single category. A typical clustering method is the k-means clustering. The k-means clustering technique receives an input of k clusters and receives a database containing N data objects. The k-means clustering technique takes these N data objects and outputs them into the k clusters satisfying the least squares standard. Of the N data objects assigned to the k clusters, those data objects that are in the same cluster have greater similarity with each other and those data objects that are in different clusters have less similarity with each other. Generally, this type of cluster similarity can be computed using a "center object" (center of attraction) obtained from the mean of data objects in each cluster.

The process of implementing the k-means clustering technique specifically comprises:

(1) From N data objects, select any k objects as initial cluster centers.

(2) Using the mean of each cluster's objects (the center object), compute the distances from each object to these center objects, and re-divide the corresponding objects according to minimum distances.

(3) Re-compute the mean (center object) of each cluster (if changed).

(4) Compute the standard measurement function. When a certain condition is met, such as when the function converges, for example, the clustering technique ends. If the condition is not met, then the clustering technique returns to step (2).

However, conventional clustering analyses suffer from at least a few drawbacks. One drawback is that the k-means clustering technique requires the input number of objects, N, to be a fixed value. In situations where the value of N is a varying value, each time N varies during processing, e.g., the value of N increases by 1, there is a need to process the addition of one new data record, which requires that steps (1) through (4), as described above, be re-executed. A second drawback is that in the case of processing high quantity of data, a considerable amount of hardware resources (e.g., memory and processor resources) is needed to execute the clustering process as described above.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As e-commerce becomes increasingly widespread, payment platforms play an ever more important role in people's everyday lives. By employing bank cards issued to users, payment platforms have made payment tremendously convenient for users and have created good payment experiences for them. However, the increase in payment convenience also adds to the risk of transactions and has placed more stringent requirements on risk control. One of the important means of risk control is a limit imposed on user spending. A payment platform can impose limit management on user transactions. A relatively common approach is to limit transactions according to fixed limits. For example, a white list can be set up for a payment platform. A higher limit can be given to users on the white list, and a lower limit can be given to users who are not on the white list. Then, a user's spending can be restricted based on an assessment of whether the user's proposed spending has exceeded the user's limit. In such an approach, the user's spending limits are generally manually set and are static. Put another way, some conventional techniques impose fixed limits on user spending that cannot be adjusted according to different users and different situations.

Embodiments of determining a temporary transaction limit are described herein. A transaction request message is received. The transaction request message comprises a request for a transaction to be approved. The transaction request message includes at least a total transaction cost and identifying information associated with the requesting user. In the event that the total transaction cost is greater than a predetermined limit associated with the user, then historical transaction data associated with various users is retrieved and analyzed to form clustered classifications. A clustered classification corresponding to the user associated with the transaction request message is determined using the historical transaction data associated with that user. A predetermined mapping rule is used to determine a dynamic quota corresponding to the clustered classification corresponding to the user. Whether the transaction request message is approved is determined based on comparing the total transaction cost to a combination of the predetermined limit and the dynamic quota.

Figure 1:
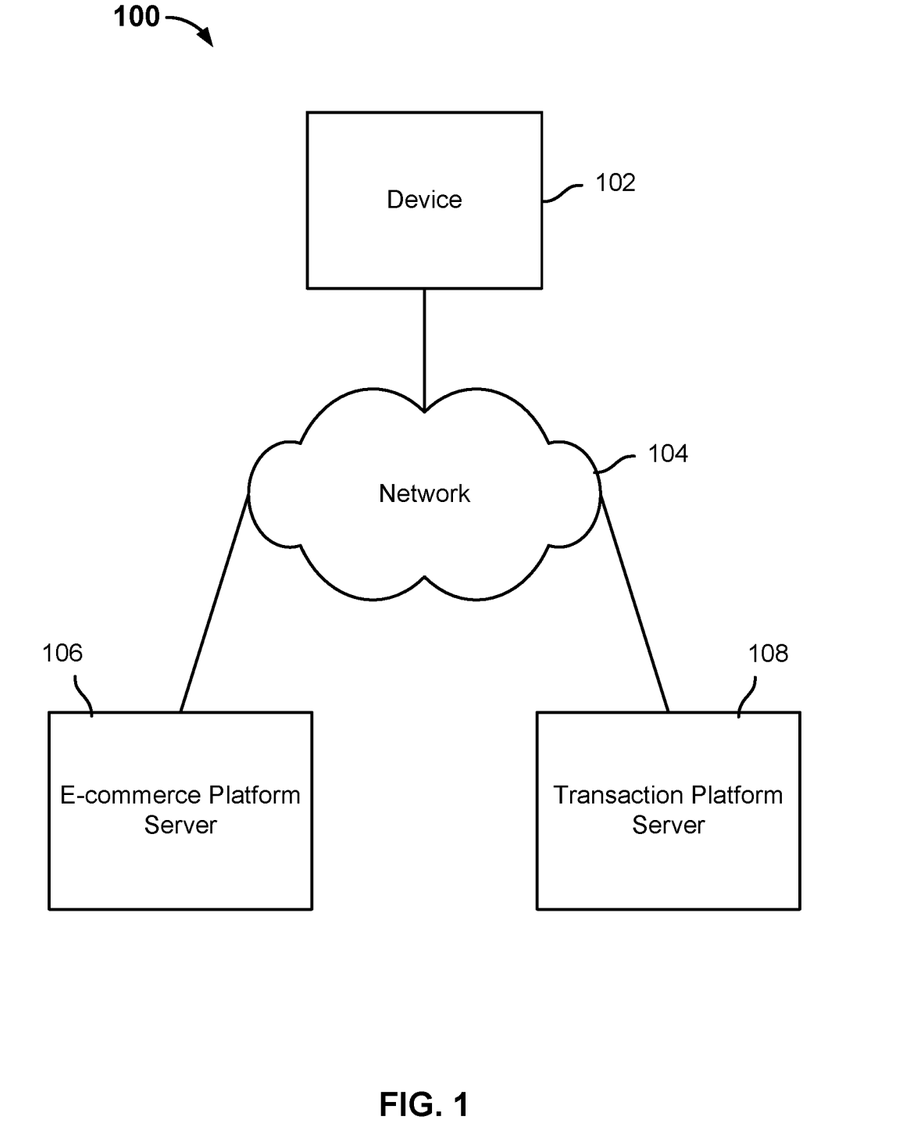
FIG. 1 is a diagram showing an embodiment of a system for determining a temporary transaction limit for a user's transaction.

FIG. 1 is a diagram showing an embodiment of a system for determining a temporary transaction limit for a user's transaction. In the example, system 100 includes device 102, network 104, e-commerce platform server 106, and transaction platform server 108.

Device 102 comprises a device through which a user may access an e-commerce platform associated with e-commerce platform server 106. For example, device 102 may comprise a smart phone, a tablet device, a desktop computer, a laptop device, a mobile device, and/or any type of computing device. The e-commerce platform provided by e-commerce platform server 106 may present user interfaces associated with displaying profiles/information associated with different products at a website and/or an application that is executing at device 102.

A user can use device 102 to browse and select products to purchase from the e-commerce platform. Once a user has selected the one or more products that he or she would like to purchase at the e-commerce platform, the e-commerce platform can generate a transaction request message that includes information associated with the transaction including identifying information associated with the user and the total cost of the transaction (the total transaction cost). E-commerce platform server 106 is configured to send the transaction request message to transaction platform server 108.

Transaction platform server 108 is configured to determine whether the transaction request message should be approved. Transaction platform server 108 is configured to determine whether the transaction total cost is greater than a predetermined limit associated with the user. In various embodiments, transaction platform server 108 is configured to retrieve historical transaction data associated with various users and analyze the retrieved data to determine clustered classifications. Transaction platform server 108 is configured to determine a clustered classification corresponding to the user using the historical transaction data associated with the user. Transaction platform server 108 is configured to determine a dynamic quota corresponding to the user based on the clustered classification corresponding to the user and a predetermined mapping rule. Transaction platform server 108 is configured to determine whether the transaction request message is approved based at least in part on comparing the total transaction cost to a combination of the predetermined limit and the dynamic quota.

As such, in various embodiments, data mining may be used to flexibly adjust transaction limits for different users in different situations.

Figure 2:
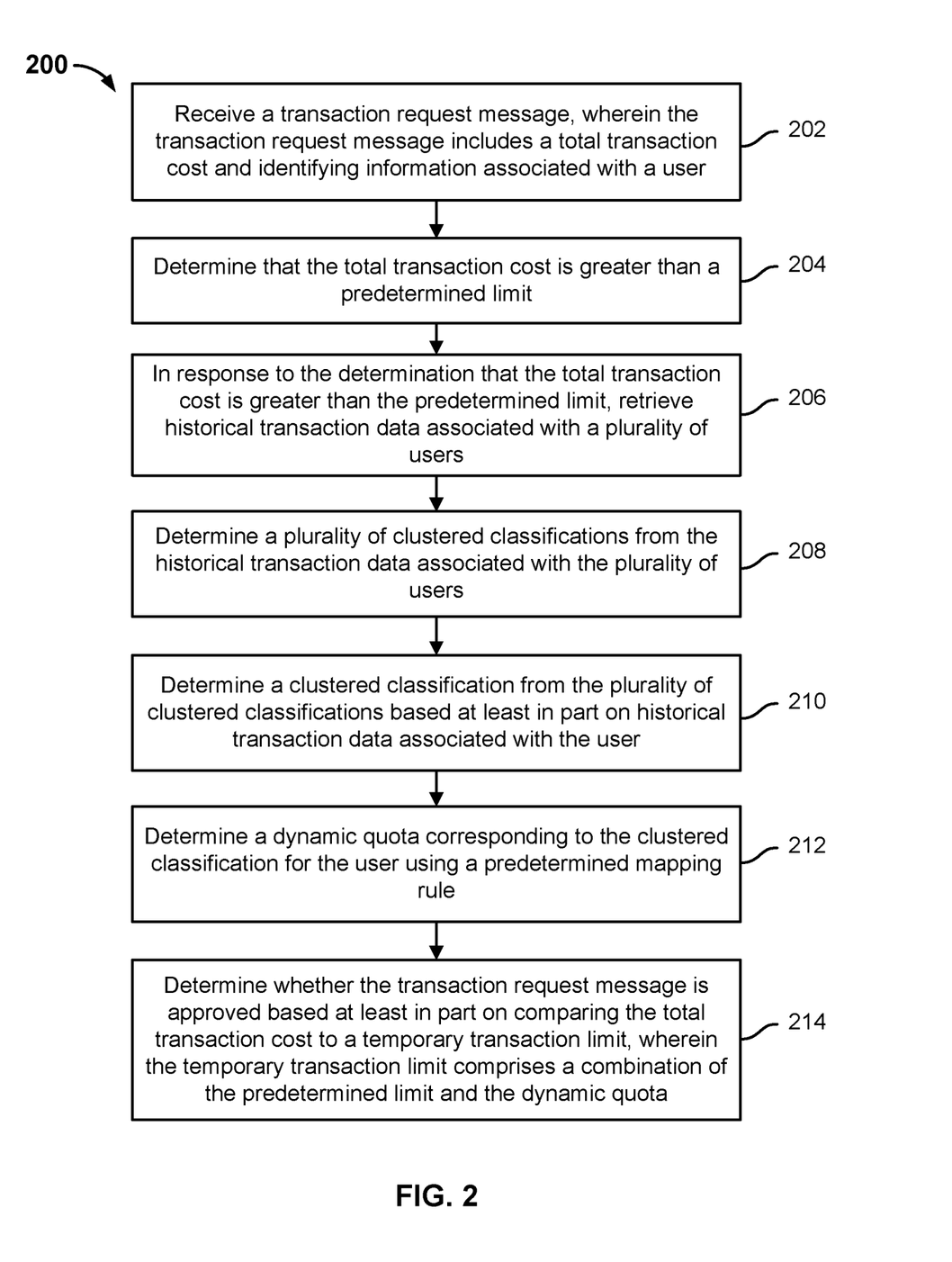
FIG. 2 is a flow diagram showing an embodiment of a process for determining a temporary transaction limit for a user's transaction.

FIG. 2 is a flow diagram showing an embodiment of a process for determining a temporary transaction limit for a user's transaction. In some embodiments, process 200 is implemented at system 100 of FIG. 1.

At 202, a transaction request message is received, wherein the transaction request message includes a total transaction cost and identifying information associated with a user.

A transaction request message comprises a request for a pending transaction to be approved of for a user. The transaction request message includes information describing the user's pending order. For example, the user has selected one or more products to purchase from an e-commerce platform. The types of products to be purchased, the cost of each individual product to be purchased, the sum of the costs of the products to be purchased (the total transaction cost), and an identifier of the user who submitted the order, for example, may be included in a transaction request message by an e-commerce platform server for the transaction platform server to determine whether the transaction can be approved.

At 204, it is determined that the total transaction cost is greater than a predetermined limit.

In some embodiments, a predetermined limit per transaction for the user may be manually configured, e.g., by a system administrator, by the user, or by default.

Figure 3:
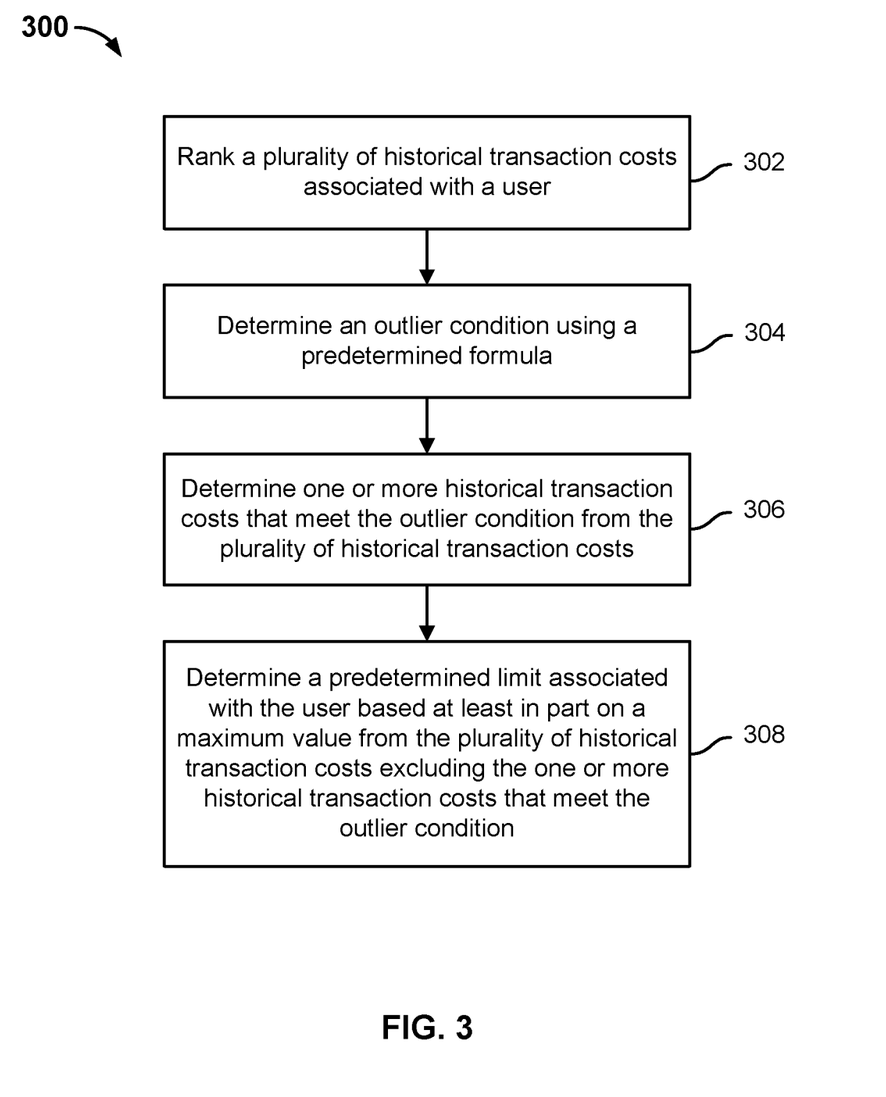
FIG. 3 is a flow diagram showing an example process of determining a user's predetermined limit.

In some other embodiments, the predetermined limit per transaction for the user may also be dynamically determined by the payment platform. For example, the payment platform may compute the predetermined limit according to certain rules. In a specific example, the payment platform may determine the predetermined limit using a density-based outlier exclusion model. FIG. 3, below, describes an example in which a predetermined limit is determined for a user using the density-based outlier exclusion model.

If it is determined that the total transaction cost included in the transaction request message is less than or equal to the predetermined limit per transaction for the user, then the transaction associated with the transaction request message is approved and process 200 ends. Otherwise, if it is determined that the total transaction cost included in the transaction request message is greater than the predetermined limit per transaction for the user, then the transaction associated with the transaction request message continues to be processed using the steps described below to determine an amount (a dynamic quota) by which to (temporarily) raise the user's predetermined limit.

At 206, in response to the determination that the total transaction cost is greater than the predetermined limit, historical transaction data associated with a plurality of users is retrieved.

After it is determined that the total transaction cost included in the transaction request message is greater than the predetermined limit per transaction for the user, historical transaction data associated with various users, including the user associated with the current transaction request message, is retrieved from storage. The various users whose historical transaction data is retrieved may comprise users of the e-commerce platform and/or the payment platform who have previously submitted transaction request messages. Historical transaction data associated with each user includes data that describes when the user has made purchases (e.g., timestamps associated with historical transactions), what the user has purchased (e.g., the products and/or other items involved in each historical transaction), and costs associated with the user's historical purchases (e.g., how much the user has spent in each historical transaction), for example.

In some embodiments, historical transaction data of users associated with the transaction platform and/or the e-commerce platform may be stored in a data warehouse. For example, the data warehouse comprises a huge database. It stores data that has been integrated from task-organizing databases. For example, the data warehouse stores data obtained from transaction processing systems (e.g., On-Line Transactional Processing (OLTP)). However, the process of converting and integrating data can be a challenge in establishing a data warehouse. A purpose to the data warehouse is the conversion of activity data into useful, strategic information. In some embodiments, the data warehouse stores the following types of data: integrated data, detailed and summarized data, historical data, and data for interpreting data.

At 208, a plurality of clustered classifications is determined from the historical transaction data associated with the plurality of users.

Data mining is applied to the retrieved historical transaction data associated with various users to generate one or more clusters, where each cluster is associated with a corresponding classification. As such, in some embodiments, a cluster is sometimes referred to as a "clustered classification."

The main purpose of establishing a data warehouse storing historical transaction data associated with various users and applying data mining to the data warehouse is to mine information and knowledge from the data warehouse that is useful for decision-making Typically, the data warehouse needs to be established before data mining can efficiently proceed. The data contained in the data warehouse itself should be clean (e.g., the data stored at the data warehouse should not have erroneous data mixed therein), complete, and integrated. Therefore, the relationship between establishing a data warehouse and mining data from it perhaps may be understood as follows: data mining is a process and technique of finding useful information in a huge data warehouse. In most situations, data mining entails taking data from the data warehouse to a data mining database or a data store. To convert huge amounts of data into useful information, it is necessary first to collect the information efficiently. Database systems with full sets of functions have become the preferred tools for collecting data. Simply stated, data warehousing is collecting useful data from other systems and placing it in an integrated storage area. In some embodiments, a relational database with especially large capacity that has been processed and integrated and is used to store data needed by decision support systems, such as data being used in decision support or data analysis. Raw data can be structured, as for example data in a relational database. It can also be semi-structured, as in text, graphic and image data. It can even be heterogeneous data distributed over networks. Any appropriate data discovery techniques can be applied.

In some embodiments, the data mining technique of cluster processing is applied to a predetermined quantity of the historical transaction data associated with users to determine one or more clustered classifications. The predetermined quantity may be configured to be a sample of data objects that adequately represent the entire body of historical transaction data.

Data mining differs intrinsically from traditional data analysis (such as query or statement analysis or online analytic processing, for example) in that data mining entails digging up information and discovering knowledge without any clear-cut assumptions. The information obtained through data mining should have three characteristics: previously unknown, effective, and practical. Previously unknown information is information that was not necessarily anticipated in advance. Data mining should discover information or knowledge that may be discovered intuitively or even information or knowledge that is counterintuitive.

In some embodiments, the historical transaction data stored for each user may include one or more data objects associated with one or more pieces of transaction data. In a specific example, each user data object may include data on three measures: the most recent spending, spending frequency, and spending amount.

The RFM (recency, frequency, and monetary, which refer to the most recent spending, spending frequency, and spending amount, respectively) model is widely used in numerous customer relationship management (CRM) analysis models.

The RFM model is considered an important tool and means for measuring customer value and customer profit-making capability. This model describes the value status of the customer in terms of three measures: recent purchasing behavior, total frequency of purchases, and amount of money spent. Theoretically, customers close to the latest spending time are customers with a greater spending potential. They are the ones that are most likely to respond to offers of immediate products or services. Large volumes of historical data show that if consumers have already purchased, they will very likely continue to purchase. Spending frequency is the number of purchases made by a consumer within a set period of time. It can be that the customers that purchase most often are the most satisfied customers. If they believe in the brand and in store loyalty, the consumers that purchase most often will also have the highest loyalty. Spending amount may be the total amount of spending within a set period of time. Spending amount is the most effective predictor. Pareto's Law says: 80% of a company's revenues come from 20% of its customers. The amount spent by the top 10% of customers may be at least double that of the next tier and may account for more than 40% of all the company's business. If one considers cumulative percentages, one may find that 40% of customers contribute 80% of a company's total business volume and that 60% of customers account for more than 90% of a company's business volume.

In some embodiments, the predetermined quantity of historical transaction data associated with various users is clustered in the light of three measures: most recent spending, spending frequency, and amount of spending. As such, each resulting clustered classification will be associated with a range of values associated with each measure of most recent spending, spending frequency, and amount of spending. For example, three clustered classifications may be formed in accordance with the cluster results, where a first clustered classification is associated with high (e.g., the highest range of values for each measure), a second clustered classification associated with medium (e.g., the second highest range of values for each measure), and a third clustered classification associated with low (e.g., the lowest range of values for each measure). For example, clustering the historical transaction data may be performed using any appropriate clustering technique, including the k-means clustering technique, the density-based spatial clustering of applications with noise (DBSCAN) technique, or a hierarchical clustering technique.

In some embodiments, steps 208 and 210 do not need to be performed for each subsequent transaction request message if they have been performed recently (e.g., within a predetermined recent amount of time). Put another way, the clustered classifications can be determined periodically and not necessarily for every received transaction request message.

At 210, a clustered classification of the plurality of clustered classifications is determined for the user based at least in part on historical transaction data associated with the user.

After clustering of historical transaction data associated with various users is complete and the corresponding classifications are obtained, one such clustered classification can be determined for the user associated with the transaction request message based on the historical data of the user. For example, the three clustered classifications that were created as mentioned above are represented by high, medium, and low.

In various embodiments, the historical data of the user associated with the transaction request message is converted to numerical values (an R value, an F value, and an M value) using the RFM method. Then, one or more stored decision trees may be used with the RFM numerical values derived from the user's historical data to determine one appropriate clustered classification for the requesting user. For example, scoring can be carried out in accordance with a stored RFM scoring rule using the user's historical data to obtain the user's RFM values.

Figure 6:
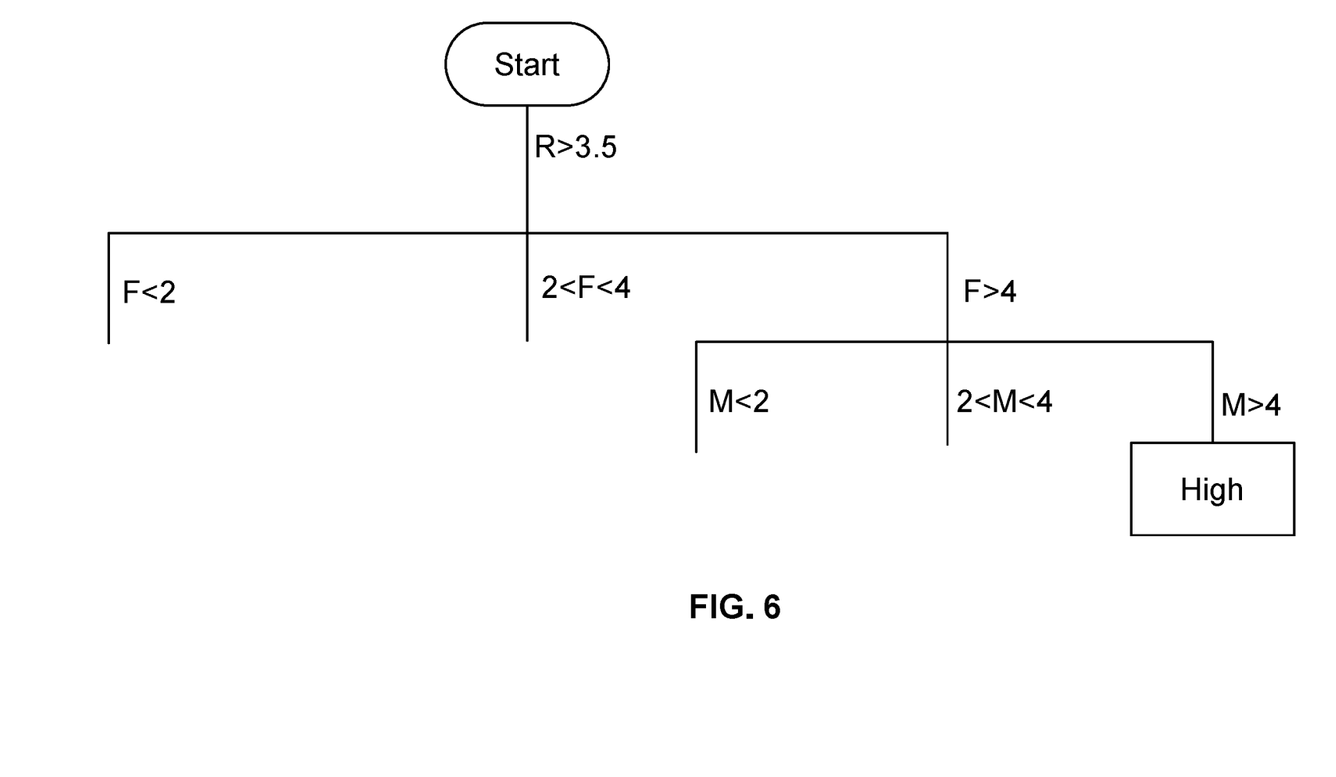
FIG. 6 shows an example of a portion of a decision tree that classifies a user based on the user's RFM numerical values.

FIG. 6 shows an example of a portion of a decision tree that classifies a user based on the user's RFM numerical values. The example portion of the decision tree that is shown in FIG. 6 shows that a user whose RFM values simultaneously satisfy $R>3.5$, $F>4$ and $M>4$ is classified as a user of the "high" clustered classification. Other portions of the decision tree that are not shown in FIG. 6 may indicate, for example, that a user whose RFM values simultaneously satisfy $R<2$, $F<2$, and $M<2$ is classified as a user of the "low" clustered classification and that the remaining users whose RFM values qualify them into neither the "high" nor "low" clustered classifications can be classified as a user of the "medium" clustered classification.

For example, the historical data of the user associated with a transaction request message is converted to the following RFM values: $R=3.7$, $F=4.1$, and $M=4.3$. Thus, based on the portion of the decision tree shown in FIG. 6, the $R=3.7$, $F=4.1$, and $M=4.3$ user may be classified as a "high" clustered classification user.

Returning to step 212, a dynamic quota corresponding to the clustered classification for the user is determined using a predetermined mapping rule.

In various embodiments, a "dynamic quota" includes a maximum amount above the predetermined limit that the user's total transaction cost can be up to and have the requested transaction be approved. In various embodiments, a predetermined mapping rule that relates each clustered classification (e.g., high, medium, and low) to a corresponding dynamic quota value is stored. For example, the "high" clustered classification is mapped through a mapping rule to a dynamic quota of $2,000; the "medium" clustered classification is mapped through a mapping rule to a dynamic quota of $1,000; and the "low" clustered classification is mapped to a dynamic quota of $500.

At 214, it is determined whether the transaction request message is approved based at least in part on comparing the total transaction cost to a temporary transaction limit, wherein the temporary transaction limit comprises a combination of the predetermined limit and the dynamic quota.

As it was previously determined at step 204 that the total transaction cost included in the transaction request message is greater than the predetermined limit associated with the user, the user's transaction limit is determined to be temporarily raised by a dynamic quota determined based at least in part on a clustered classification associated with the user in accordance with the clustering analysis result. In various embodiments, the temporary transaction limit is the sum of the predetermined limit and the dynamic quota. The dynamic quota determined for the user can be thought to temporarily raise the user's predetermined limit because a dynamic quota can be determined for each of the user's transactions, while the predetermined limit for the user may not change over multiple transactions. If the total transaction cost is not greater than the sum of the predetermined limit and the dynamic quota, then the transaction associated with the transaction request message is approved. Otherwise, if the total transaction cost is greater than the sum of the predetermined limit and the dynamic quota, then the transaction associated with the transaction request message may not be approved.

In some embodiments, clustering of the predetermined quantity of historical transaction data may be completed prior to process 200 and/or not repeated for each instance of process 200. When a new transaction request message is received from a user, it is not necessary to re-cluster the large volume of data including this newly received data. On the contrary, it is possible to search in the previously determined classifications based on the historical transaction data associated with the user associated with the transaction request message for the corresponding clustered classification to obtain the dynamic quota according to a predetermined mapping rule. Thus, the sum of the predetermined limit and the dynamic quota may serve as a temporary transaction limit for the user and then a determination can be made as to whether the total transaction cost included in the transaction request message sent by the user may be approved based on the temporary transaction limit.

The following is an example of applying process 200: a transaction request message that includes identifying information associated with user A is received at a transaction platform server. The total transaction cost included in this request message is $2,500. The predetermined limit for this user is, for example, $2,000. In some embodiments, the predetermined limit is a fixed value. In some embodiments, the predetermined limit is dynamically determined using the technique described below in connection with FIG. 3. The clustered classification obtained for this user among the cluster classifications according to the user's historical data is medium, and based on a predetermined mapping rule, the dynamic quota corresponding to the medium clustered classification is $1,000. Thus, the temporary limit for the user is the sum of the predetermined limit and the dynamic quota, i.e., $1000+$2000=$3,000. The total transaction cost that is associated with the transaction request message, $2,500, is less than the temporary limit of $3,000. Therefore, the transaction associated with the transaction request message can be approved. For example, in the event that the transaction request message is approved, then the requested transaction associated with the total transaction cost can be completed and the products associated with the transaction request message become approved to be purchased by the requesting user. However, if the total transaction cost that is associated with the transaction request message is $3,500, then that cost would be greater than the temporary limit of $3,000, and the transaction associated with the transaction request message would be denied.

FIG. 3 is a flow diagram showing an example process of determining a user's predetermined limit. In some embodiments, process 300 is implemented at system 100 of FIG. 1. In some embodiments, the predetermined limit used in step 204 of process 200 of FIG. 2 can be determined using the example of process 300.

Figure 4:
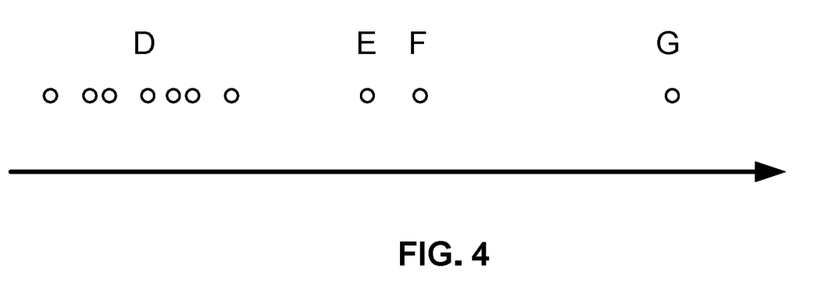
FIG. 4 is a diagram showing an example of data points in a population.

In the density-based outlier exclusion model, the differences between data points are regarded as "distances" in one-dimensional space and the entirety of the data points is regarded as a "population." Thus, especially scattered data points within each "population" are regarded as "outliers." In the example of process 300, a data point comprises a user's historical transaction cost. A user's historical transaction cost comprises the total cost associated with a historical transaction that was requested by the user. As shown in the example of FIG. 4, the data points in region D are relatively concentrated and are dense points within the population. The data points in regions E, F and G are relatively scattered and are therefore referred to as "outliers." Process 300 describes an example in which outlier historical transaction costs associated with a user are excluded for being used to determine a predetermined limit for the user.

At 302, a plurality of historical transaction costs associated with a user is ranked.

In some embodiments, the n historical transaction costs associated with a user can be ranked based on transaction costs. For example, the transaction costs are ranked from smallest to largest. For example, the ranked historical transaction costs are $d_1, d_2, \ldots, d_n$.

At 304, an outlier condition is determined using a predetermined formula.

In some embodiments, the predetermined formula is the following:

$$|d_i - d_{i-k}| > C, i = k+1, \ldots, n \tag{1}$$

In formula (1), i indicates the ith transaction, $d_1, d_2, \ldots, d_n$ comprises the ranked historical transaction costs, C is set to a threshold value, and k is set to a preset distance. Thus, with the formula described above, when the distance from the ith transaction cost ($d_i$) to the transaction cost k transactions away is greater than threshold value C, the ith transaction cost ($d_i$) is regarded as an outlier.

Therefore, by configuring the values of C and k, formula (1) can be used to determine those ith historical transaction cost(s) that meet the condition for being an outlier.

At 306, one or more historical transaction costs that meet the outlier condition are determined from the plurality of historical transaction costs.

Figure 5:
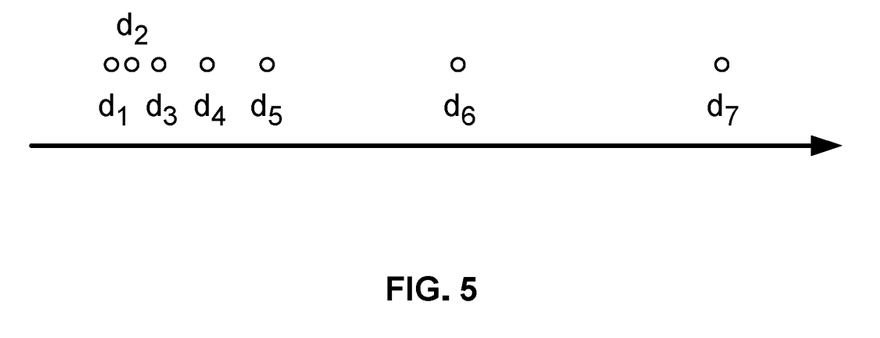
FIG. 5 is a diagram showing an example of data points $d_1$ through $d_7$ in a population.

For an example using specific numbers, one may refer to FIG. 5, which shows data points associated with a population of historical transaction costs $d_1$ through $d_7$. The historical transaction costs $d_1$ through $d_7$ ordered from small to large are $d_1=100$, $d_2=110$, $d_3=123$, $d_4=195$, $d_5=229$, $d_6=1410$, and $d_7=2100$. In the example of FIG. 5, C is set to 300, and k is set to 3. Thus, applying formula (1) yields:

$$|d_6 - d_3| = 1287 > 300 = C,$$

$$|d_7 - d_4| = 1905 > 300 = C,$$

Therefore, $d_6$ and $d_7$ are determined to be outliers, which are excluded from the population. The remaining data points in the population include $d_1$ through $d_5$.

At 308, a predetermined limit associated with the user is determined based at least in part on a maximum value from the plurality of historical transaction costs excluding the one or more historical transaction costs that meet the outlier condition.

The maximum value of $d_1$ through $d_5$ is 229. Thus, the maximum value 229 is set as the predetermined limit for the user.

In some embodiments, a transaction request message may include one or more product types associated with a transaction. That is, the transaction request message may include the individual cost of each of multiple different types of products. These different product types might correspond to different transaction scenarios. In the event that there are multiple transaction scenarios associated with a transaction request message, there could be a corresponding predetermined limit associated with each such scenario.

Figure 7:
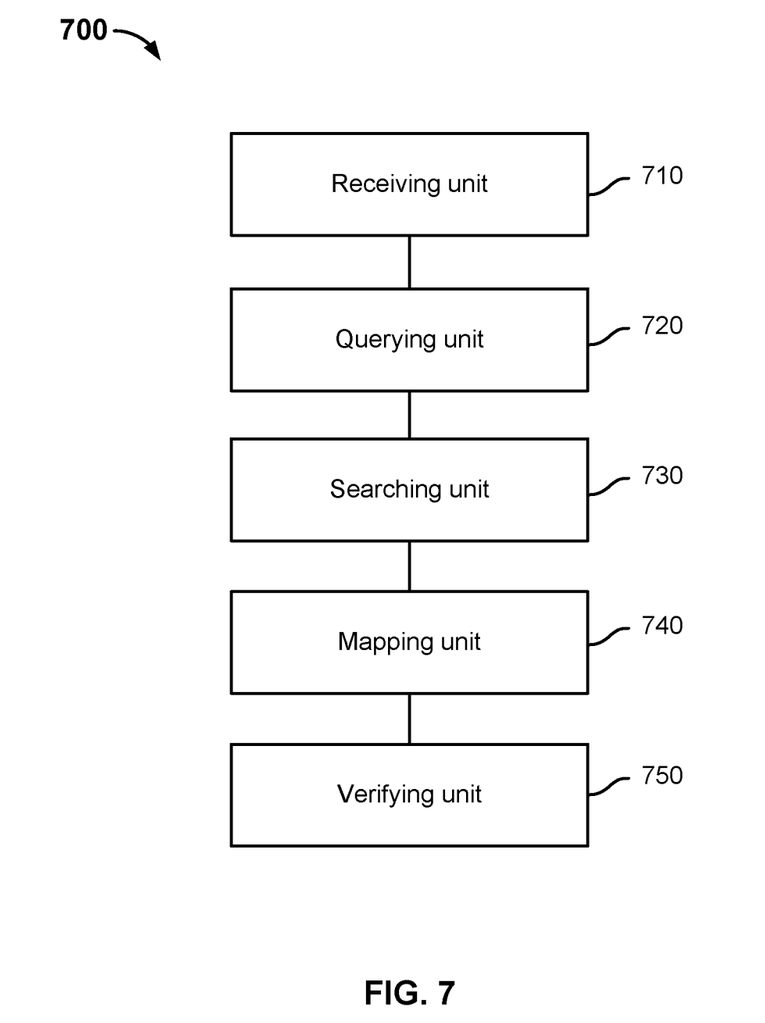
FIG. 7 is a diagram showing an embodiment of a system for determining a temporary transaction limit for a user's transaction.

FIG. 7 is a diagram showing an embodiment of a system for determining a temporary transaction limit for a user's transaction. In the example, system 700 includes receiving unit 710, querying unit 720, searching unit 730, mapping unit 740, and verifying unit 750.

The units can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices.

Receiving unit 710 is configured to receive a transaction request message. The transaction request message includes a total transaction cost and identifying information associated with a user. The transaction request message may also describe one or more units of product types associated with the transaction.

Querying unit 720 is configured to compare the total transaction cost to a predetermined limit associated with the user. Querying unit 720 is configured to query for historical transaction data associated with various users in the event that the total transaction cost associated with the transaction request message received by receiving unit 710 is greater than a predetermined limit.

Searching unit 730 is configured to determine a plurality of clustered classifications from at least a portion of the historical transaction data associated with various users. In some embodiments, the clustered classifications are obtained after subjecting a predetermined quantity of the historical transaction data associated with various users to clustering treatment in the light of three measures: most recent spending, spending frequency, and amount of spending. By employing big data simulation scenarios, new needs are uncovered, and the rate of return is raised on investment. Big data analysis techniques enable merchants to store and analyze this data together with transactional behavior data in real time and to do so with greater cost efficiency. With big data techniques, this data can be integrated and subject to data mining. Thereupon, model simulation can be used in some situations to assess which scheme has the highest rate of return on investment under different variables.

Searching unit 730 is also configured to determine a clustered classification corresponding to the user associated with the transaction request message based on the historical transaction data of the user associated with the transaction request message.

Mapping unit 740 is configured to determine a dynamic quota corresponding to the clustered classification associated with the user associated with the transaction request message in accordance with a predetermined mapping rule.

Verifying unit 750 is configured to approve the transaction request message in the event that the total transaction cost is not greater than the sum of the predetermined limit and the dynamic quota. Verifying unit 750 is configured to deny the transaction request message in the event that the total transaction cost is greater than the sum of the predetermined limit and the dynamic quota.

Figure 8:
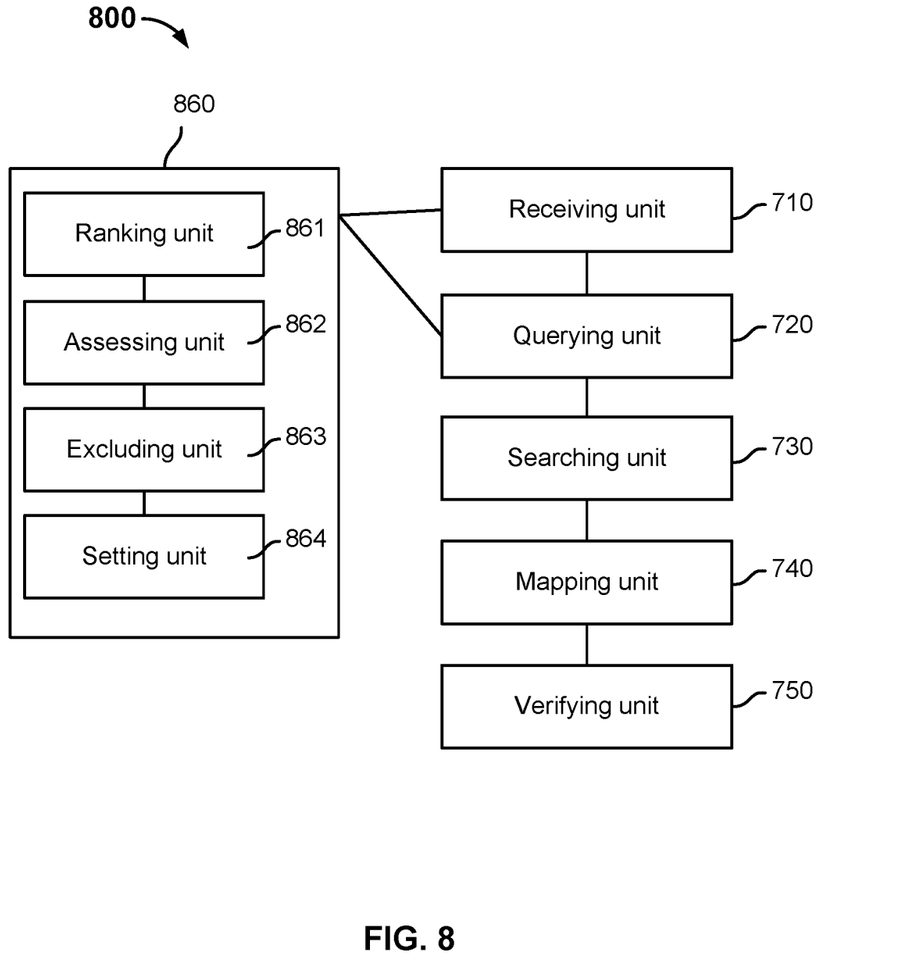
FIG. 8 is a diagram showing an embodiment of a predetermined limit computing unit.

FIG. 8 is a diagram showing an embodiment of a predetermined limit computing unit. In the example, predetermined limit computing unit 860 of system 800 is connected to receiving unit 710 and querying unit 720. System 800 additionally includes receiving unit 710, querying unit 720, searching unit 730, mapping unit 740, and verifying unit 750 of FIG. 7.

Ranking unit 861 is configured to rank historical transaction costs associated with a user. For example, the user is associated with a transaction request message.

Assessing unit 862 is configured to determine an outlier condition using a predetermined formula.

Formula (1), as described above, is such a predetermined formula in which i indicates the ith transaction, $d_1, d_2, \ldots, d_n$ are the ranked historical transaction costs, C is set to a threshold value, and k is set to a preset distance. Thus, using formula (1) as described above, when the distance from the ith transaction cost ($d_i$) to the transaction cost k transactions away is greater than threshold value C, the ith transaction cost ($d_i$) is regarded as an outlier. Therefore, by configuring the values of C and k, formula (1) can be used to determine those ith historical transaction costs that meet the condition for being an outlier.

Excluding unit 863 is configured to determine one or more historical transaction costs from the plurality of historical transaction costs that meet the outlier condition.

Setting unit 864 is configured to determine a predetermined limit for the user as the maximum value from the plurality of historical transaction costs excluding the one or more historical transaction costs that meet the outlier condition.

In an embodiment, the clustered classifications include classifications obtained after a predetermined quantity of big data has been subjected to cluster processing.

Figure 9:
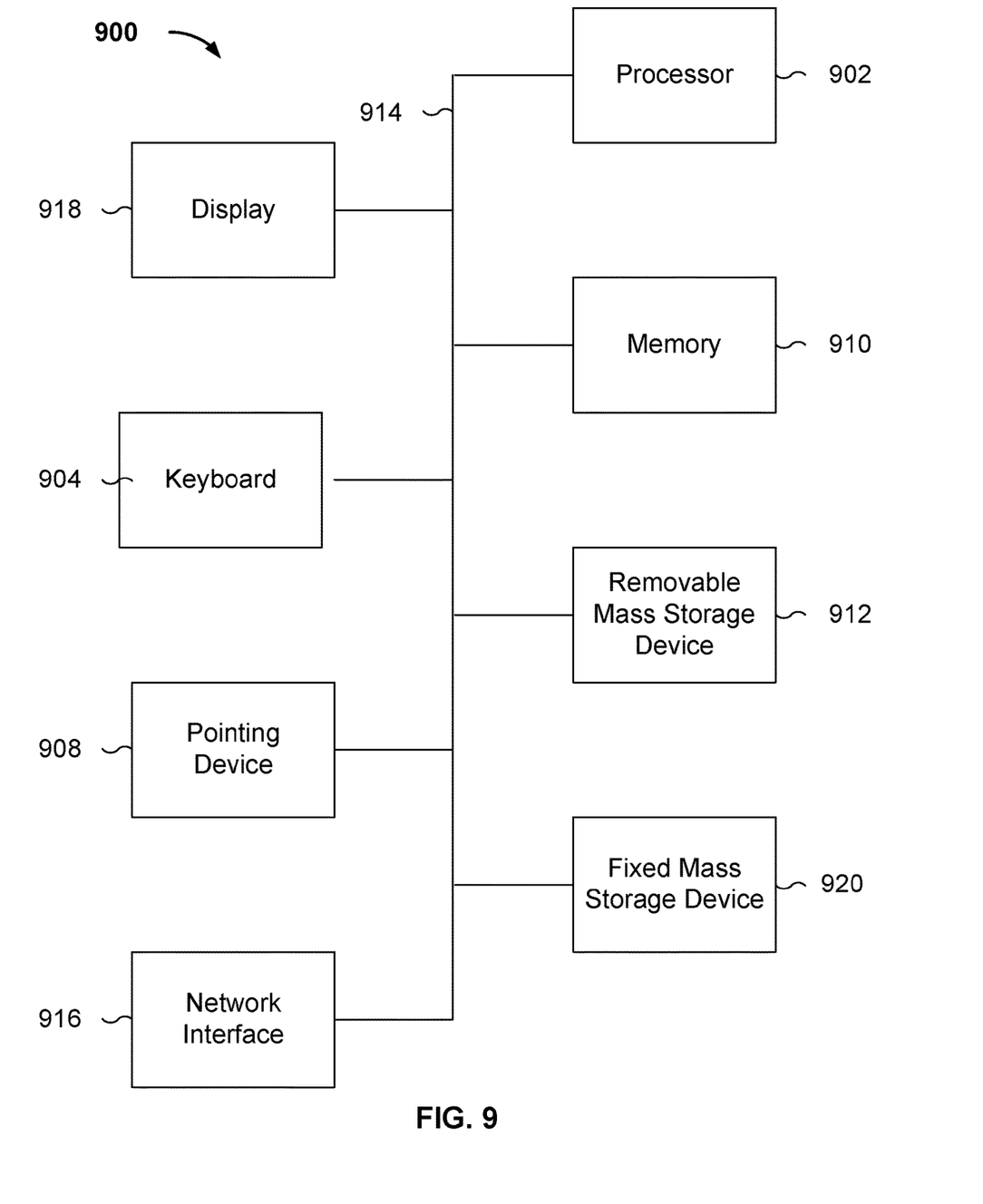
FIG. 9 is a functional diagram illustrating an embodiment of a programmed computer system for implementing generating a temporary transaction limit.

FIG. 9 is a functional diagram illustrating an embodiment of a programmed computer system for implementing generating a temporary transaction limit. As will be apparent, other computer system architectures and configurations can be used to generate a temporary transaction limit. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In some embodiments, processor 902 includes and/or is used to generate a temporary transaction limit.

Processor 902 is coupled bi-directionally with memory 910, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data, and objects used by the processor 902 to perform its functions (e.g., programmed instructions). For example, memory 910 can include any suitable computer readable storage media, described below, depending on whether, for example, data access needs to be bi-directional or unidirectional. For example, processor 902 can also directly and very rapidly retrieve and store frequently needed data in a cache memory (not shown).

A removable mass storage device 912 provides additional data storage capacity for the computer system 900 and is coupled either bi-directionally (read/write) or uni-directionally (read only) to processor 902. For example, storage 912 can also include computer readable media such as magnetic tape, flash memory, PC-CARDS, portable mass storage devices, holographic storage devices, and other storage devices. A fixed mass storage 920 can also, for example, provide additional data storage capacity. The most common example of fixed mass storage 920 is a hard disk drive. Mass storage 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display 918, a network interface 916, a keyboard 904, and a pointing device 908, as well as an auxiliary input/output device interface, a sound card, speakers, and other subsystems as needed. For example, the pointing device 908 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

The systems, devices, modules, or units explained by the embodiments described above may be realized by computer chips or entities or by products that possess a certain function.

For convenience of description, when describing the device above, functions are described as separate units. Of course, during implementation of the present application, the functions of the various units may be achieved in the same or multiple software and/or hardware configurations.

As can be seen through the description of the embodiment above, persons skilled in the art can clearly understand that the present application can be realized with the aid of software plus the necessary common hardware platform. On the basis of such an understanding, the essence of the technical scheme of the present application, or the part that contributes to the prior art, may be embodied in the form of a software product. The computer software product may be stored in a storage medium, such as ROM/RAM, magnetic disks, or optical disks, and include some commands used to cause a piece of computer equipment (which can be a personal computer, a server, or network equipment) to execute the processes described by the various embodiments of the present application or by certain portions of the embodiments.

The present application may be used in many general or specialized computer systems or configurations. For example: personal computers, servers, handheld devices or portable equipment, tablet type equipment, multiprocessor systems, microprocessor-based systems, set-top boxes, programmable consumer electronic equipment, networked PCs, minicomputers, mainframe computers, distributed computing environments that include any of the systems or equipment above, and so forth.

The present application can be described in the general context of computer executable commands executed by a computer, such as a program module. Generally, program modules include routines, programs, objects, components, data structures, etc., to execute specific tasks or achieve specific abstract data types. The present application can also be carried out in distributed computing environments; in such distributed computing environments, tasks are executed by remote processing equipment connected via communication networks. In distributed computing environments, program modules can be located on storage media at local or remote computers that include storage equipment.

Although the present application has been portrayed through embodiments, persons with ordinary skill in the art know that the present application has many variants and variations that do not depart from the spirit of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive a transaction request message, wherein the transaction request message includes a total transaction cost associated with a requested transaction and identifying information associated with a user, wherein the user is associated with a plurality of historical transaction costs;
      dynamically determine a predetermined limit associated with the user, wherein to dynamically determine the predetermined limit comprises to:
         rank, by size, the plurality of historical transaction costs associated with the user;
         determine an outlier condition;
         determine one or more historical transaction costs associated with the user that meet the outlier condition from the plurality of historical transaction costs associated with the user; and
         determine the predetermined limit associated with the user based at least in part on a maximum value from the plurality of historical transaction costs associated with the user excluding the one or more historical transaction costs associated with the user that meet the outlier condition;

determine the total transaction cost is greater than the predetermined limit;
obtain a plurality of clustered classifications that is generated from historical data of a plurality of users based at least in part on clustering at least a portion of the historical data of the plurality of users;
select a clustered classification corresponding to the user from the plurality of clustered classifications based at least in part on the plurality of historical transaction costs associated with the user, including to:
apply a user score derived based on the plurality of historical transaction costs associated with the user to determine the selected clustered classification;
determine a dynamic quota corresponding to the clustered classification for the user using a predetermined mapping rule, wherein a first clustered classification is related by the predetermined mapping rule to a first dynamic quota and a second clustered classification is related by the predetermined mapping rule to a second dynamic quota, wherein the first dynamic quota is different from the second dynamic quota;
determine to approve the transaction request message based at least in part on determining that the total transaction cost is less than a temporary transaction limit, wherein the temporary transaction limit comprises a combination of the predetermined limit and the dynamic quota; and
in response to the determination to approve the transaction request message, complete the requested transaction; and
a memory coupled to the processor and configured to provide the processor with instructions.

2. The system of claim 1, wherein the processor is further configured to generate the plurality of clustered classifications from the historical data of the plurality of users by clustering on at least a portion of the historical data of the plurality of users along one or more measures.

3. The system of claim 2, wherein the one or more measures comprise one or more of the following: most recent spending, spending frequency, and amount of spending.

4. The system of claim 1, wherein to select the clustered classification from the plurality of clustered classifications based at least in part on the plurality of historical transaction costs associated with the user comprises to:
convert the plurality of historical transaction costs associated with the user into values corresponding to one or more measures; and
compare the values corresponding to the one or more measures to ranges of values corresponding to the one or more measures associated with the clustered classification.

5. The system of claim 1, wherein the temporary transaction limit comprises a sum of the predetermined limit and the dynamic quota.

6. A method, comprising:
receiving a transaction request message, wherein the transaction request message includes a total transaction cost associated with a requested transaction and identifying information associated with a user, wherein the user is associated with a plurality of historical transaction costs;
dynamically determining a predetermined limit associated with the user, wherein dynamically determining the predetermined limit comprises:
ranking, by size, the plurality of historical transaction costs associated with the user;
determining an outlier condition;
determining one or more historical transaction costs associated with the user that meet the outlier condition from the plurality of historical transaction costs associated with the user; and
determining the predetermined limit associated with the user based at least in part on a maximum value from the plurality of historical transaction costs associated with the user excluding the one or more historical transaction costs associated with the user that meet the outlier condition;
determining the total transaction cost is greater than the predetermined limit;
obtaining a plurality of clustered classifications that is generated from historical data of a plurality of users based at least in part on clustering at least a portion of the historical data of the plurality of users;
selecting, using one or more processors, a clustered classification corresponding to the user from the plurality of clustered classifications based at least in part on the plurality of historical transaction costs associated with the user, including:
applying a user score derived based on the plurality of historical transaction costs associated with the user to determine the selected clustered classification;
determining a dynamic quota corresponding to the clustered classification for the user using a predetermined mapping rule, wherein a first clustered classification is related by the predetermined mapping rule to a first dynamic quota and a second clustered classification is related by the predetermined mapping rule to a second dynamic quota, wherein the first dynamic quota is different from the second dynamic quota;
determining to approve the transaction request message based at least in part on determining that the total transaction cost is less than a temporary transaction limit, wherein the temporary transaction limit comprises a combination of the predetermined limit and the dynamic quota; and
in response to the determination to approve the transaction request message, completing the requested transaction.

7. The method of claim 6, further comprising generating the plurality of clustered classifications from the historical data of the plurality of users by clustering on at least a portion of the historical data of the plurality of users along one or more measures.

8. The method of claim 7, wherein the one or more measures comprise one or more of the following: most recent spending, spending frequency, and amount of spending.

9. The method of claim 6, wherein selecting the clustered classification from the plurality of clustered classifications based at least in part on the plurality of historical transaction costs associated with the user comprises:
converting the plurality of historical transaction costs associated with the user into values corresponding to one or more measures; and
comparing the values corresponding to the one or more measures to ranges of values corresponding to the one or more measures associated with the clustered classification.

10. The method of claim 6, wherein the temporary transaction limit comprises a sum of the predetermined limit and the dynamic quota.

11. A computer program product, the computer program product being embodied in a non-transitory computer readable storage medium and comprising computer instructions for:
  receiving a transaction request message, wherein the transaction request message includes a total transaction cost associated with a requested transaction and identifying information associated with a user, wherein the user is associated with a plurality of historical transaction costs;
  dynamically determining a predetermined limit associated with the user, wherein dynamically determining the predetermined limit comprises:
    ranking, by size, the plurality of historical transaction costs associated with the user;
    determining an outlier condition;
    determining one or more historical transaction costs associated with the user that meet the outlier condition from the plurality of historical transaction costs associated with the user; and
    determining the predetermined limit associated with the user based at least in part on a maximum value from the plurality of historical transaction costs associated with the user excluding the one or more historical transaction costs associated with the user that meet the outlier condition;
  determining the total transaction cost is greater than the predetermined limit;
  obtaining a plurality of clustered classifications that is generated from historical data of a plurality of users based at least in part on clustering at least a portion of the historical data of the plurality of users;
  selecting a clustered classification corresponding to the user from the plurality of clustered classifications based at least in part on the plurality of historical transaction costs associated with the user, including:
    applying a user score derived based on the plurality of historical transaction costs associated with the user to determine the selected clustered classification;
  determining a dynamic quota corresponding to the clustered classification for the user using a predetermined mapping rule, wherein a first clustered classification is related by the predetermined mapping rule to a first dynamic quota and a second clustered classification is related by the predetermined mapping rule to a second dynamic quota, wherein the first dynamic quota is different from the second dynamic quota;
  determining to approve the transaction request message based at least in part on determining that the total transaction cost is less than a temporary transaction limit, wherein the temporary transaction limit comprises a combination of the predetermined limit and the dynamic quota; and
  in response to the determination to approve the transaction request message, completing the requested transaction.

12. The system of claim 1, wherein the outlier condition is determined based at least in part on $|d_i - d_{i-k}| > C, i = k+1, \ldots, n$,
  where i indicates an ith historical transaction cost associated with the user, $d_1, d_2, \ldots, d_n$ comprises n number of historical transaction costs associated with the user ranked by size, C is a threshold value, and k is a preset distance.

13. The system of claim 1, wherein the historical data of the plurality of users comprises at least partially structured historical data of the plurality of users and wherein the processor is further configured to:
  integrate raw historical data of users from a plurality of systems;
  generate the at least partially structured historical data of the plurality of users by structuring the raw historical data of users; and
  store the at least partially structured historical data of the plurality of users in one or more databases.

* * * * *